(12) United States Patent
Stojancic et al.

(10) Patent No.: US 9,060,169 B2
(45) Date of Patent: Jun. 16, 2015

(54) METHODS AND APPARATUS FOR PROVIDING A SCALABLE DEBLOCKING FILTERING ASSIST FUNCTION WITHIN AN ARRAY PROCESSOR

(71) Applicants: Mihailo M. Stojancic, San Jose, CA (US); Gerald George Pechanek, Cary, NC (US)

(72) Inventors: Mihailo M. Stojancic, San Jose, CA (US); Gerald George Pechanek, Cary, NC (US)

(73) Assignee: Altera Corporation, San Jose, CA (US)

( * ) Notice: Subject to any disclaimer, the term of this patent is extended or adjusted under 35 U.S.C. 154(b) by 108 days.

(21) Appl. No.: 14/011,835

(22) Filed: Aug. 28, 2013

(65) Prior Publication Data

US 2013/0343466 A1    Dec. 26, 2013

Related U.S. Application Data

(63) Continuation of application No. 11/737,175, filed on Apr. 19, 2007, now Pat. No. 8,542,744.

(60) Provisional application No. 60/802,252, filed on May 19, 2006.

(51) Int. Cl.
| | |
|---|---|
| *H04N 7/12* | (2006.01) |
| *H04N 11/02* | (2006.01) |
| *H04N 11/04* | (2006.01) |
| *H04N 19/80* | (2014.01) |
| *H04N 19/42* | (2014.01) |
| *H04N 19/436* | (2014.01) |
| *H04N 19/59* | (2014.01) |

(52) U.S. Cl.
CPC .......... *H04N 19/0089* (2013.01); *H04N 19/80* (2014.11); *H04N 19/42* (2014.11); *H04N 19/436* (2014.11); *H04N 19/59* (2014.11)

(58) Field of Classification Search
CPC ................... H04N 19/0089; H04N 19/00478; H04N 19/00521; H04N 11/04
USPC .............. 375/E7.103, E7.19, 240.24, 240.25; 348/721
See application file for complete search history.

(56) References Cited

U.S. PATENT DOCUMENTS 8,243,815 B2 *  8/2012  Hussain et al. .......... 375/240.22
8,542,744 B2 *  9/2013  Stojancic et al. ........ 375/240.25

* cited by examiner

*Primary Examiner* — Saleh Najjar
*Assistant Examiner* — Feliciano Mejia
(74) *Attorney, Agent, or Firm* — Law Offices of Peter H. Priest, PLLC

(57) ABSTRACT

Apparatus and methods for scalable block pixel filtering are described. A block filtering instruction is issued to a processing element (PE) to initiate block pixel filtering hardware by causing at least one command and at least one parameter be sent to a command and control function associated with the PE. A block of pixels is fetched from a PE local memory to be stored in a register file of a hardware assist module. A sub-block of pixels is processed to generate sub-block parameters and the block of pixels is filtered in a horizontal/vertical edge filtering computation pipeline using the sub-block parameters.

20 Claims, 8 Drawing Sheets

| IndexA (for α) or IndexB (for β) | | | | | | | | | | | | | | | | | | | | | | | | | |
|---|---|---|---|---|---|---|---|---|---|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
| α 0 | 0 | 0 | 0 | 0 | 0 | 0 | 0 | 0 | 0 | 0 | 0 | 0 | 0 | 0 | 0 | 0 | 0 | 0 | 0 | 4 | 4 | 5 | 6 | 7 | 9 |
| β 0 | 0 | 0 | 0 | 0 | 0 | 0 | 0 | 0 | 0 | 0 | 0 | 0 | 0 | 0 | 0 | 0 | 0 | 0 | 0 | 3 | 3 | 3 | 4 | 4 | 4 |

| IndexA (for α) or IndexB (for β) | | | | | | | | | | | | | | | | | | | | | | | | | |
|---|---|---|---|---|---|---|---|---|---|---|---|---|---|---|---|---|---|---|---|---|---|---|---|---|---|
| 26 | 27 | 28 | 29 | 30 | 31 | 32 | 33 | 34 | 35 | 36 | 37 | 38 | 39 | 40 | 41 | 42 | 43 | 44 | 45 | 46 | 47 | 48 | 49 | 50 | 51 |
| α 10 | 12 | 14 | 17 | 20 | 24 | 28 | 33 | 39 | 46 | 55 | 65 | 76 | 90 | 106 | 126 | 148 | 175 | 207 | 245 | 255 | 255 | 255 | 255 | 255 | 255 |
| β 6 | 6 | 7 | 7 | 8 | 8 | 9 | 9 | 10 | 10 | 11 | 11 | 12 | 12 | 13 | 13 | 14 | 14 | 15 | 15 | 16 | 16 | 17 | 17 | 18 | 18 |

Fig. 7

| | IndexA | | | | | | | | | | | | | | | | | | | | | | | | | |
|---|---|---|---|---|---|---|---|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
| Bs = 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 1 | 1 |
| Bs = 2 | 0 | 0 | 0 | 0 | 0 | 0 | 0 | 0 | 0 | 0 | 0 | 0 | 0 | 0 | 0 | 0 | 0 | 0 | 0 | 0 | 1 | 1 | 1 | 1 | 1 | 1 |
| Bs=3 or 4 | 0 | 0 | 0 | 0 | 0 | 0 | 0 | 0 | 0 | 0 | 0 | 0 | 0 | 0 | 0 | 1 | 1 | 1 | 1 | 1 | 1 | 1 | 1 | 1 | 1 | 1 |

| | IndexA | | | | | | | | | | | | | | | | | | | | | | | | | |
|---|---|---|---|---|---|---|---|---|---|---|---|---|---|---|---|---|---|---|---|---|---|---|---|---|---|---|
| | 26 | 27 | 28 | 29 | 30 | 31 | 32 | 33 | 34 | 35 | 36 | 37 | 38 | 39 | 40 | 41 | 42 | 43 | 44 | 45 | 46 | 47 | 48 | 49 | 50 | 51 |
| Bs = 1 | 1 | 1 | 1 | 1 | 1 | 1 | 1 | 2 | 2 | 2 | 3 | 3 | 3 | 4 | 4 | 4 | 5 | 5 | 6 | 6 | 7 | 8 | 9 | 10 | 11 | 13 |
| Bs = 2 | 1 | 1 | 1 | 1 | 2 | 2 | 2 | 2 | 3 | 3 | 3 | 4 | 4 | 5 | 5 | 6 | 7 | 8 | 8 | 10 | 11 | 12 | 13 | 15 | 17 | |
| Bs=3 or 4 | 1 | 2 | 2 | 2 | 3 | 3 | 3 | 4 | 4 | 4 | 5 | 6 | 6 | 7 | 8 | 9 | 10 | 11 | 13 | 14 | 16 | 18 | 20 | 23 | 25 | |

Fig. 8

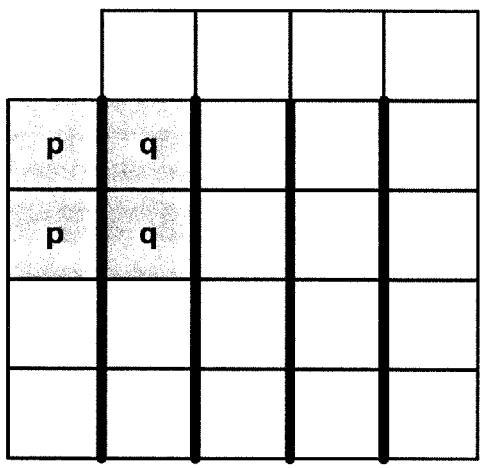
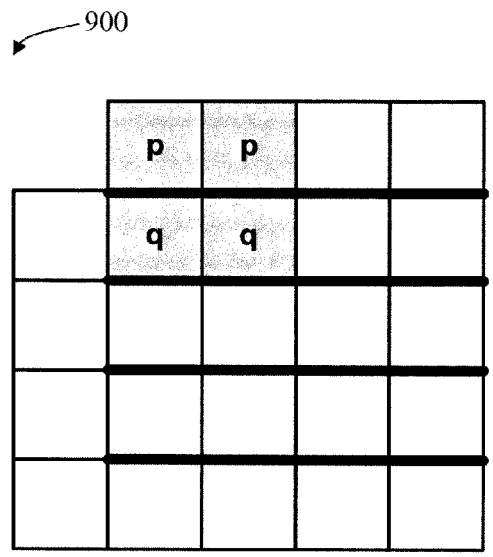

A 16x16 MB extended four pixels to the Left and 4 pixels up in vertical direction; Four vertical edges of interest for deblocking filtering are shown A 16x16 MB extended four pixels to the Left and 4 pixels up in vertical direction; Four horizontal edges of interest for deblocking filtering are shown

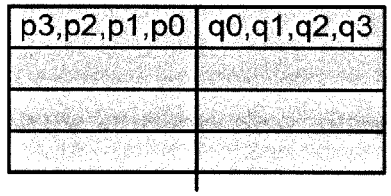
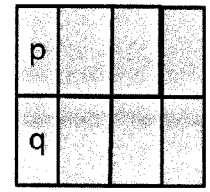

Horizontal (p,q) pair
(a group of 2 4x4 blocks with a vertical edge)

Vertical (p,q) pair
(a group of 2 4x4 blocks with a horizontal edge)

Fig. 9

METHODS AND APPARATUS FOR PROVIDING A SCALABLE DEBLOCKING FILTERING ASSIST FUNCTION WITHIN AN ARRAY PROCESSOR

CROSS REFERENCE TO RELATED APPLICATIONS

The present application is a continuation of U.S. application Ser. No. 11/737,175, filed Apr. 19, 2007 which claims the benefit of U.S. Provisional Application No. 60/802,252, filed May 19, 2006, which are incorporated by reference herein in their entirety.

FIELD OF THE INVENTION

The present invention relates generally to improvements in parallel data processing architectures for video processing and more particularly to apparatus and methods for providing a scalable digital video deblocking filtering assist function within an array processor.

BACKGROUND OF THE INVENTION

Increasing demand for high definition digital video products, including interactive TV in a HD format and HD video compression encoding and decoding, requires increasing sophistication, flexibility, and performance in the supporting electronics. The sophistication, flexibility, and performance requirements for HD digital video processing exceeds the capabilities of current generations of processor architectures by, in many cases, orders of magnitude.

The demands of video encoding for HD formats are both memory and data processing intensive, requiring efficient and high bandwidth memory organizations coupled with compute intensive capabilities. In addition, a video encoding product must be capable of supporting multiple standards each of which includes multiple optional features which can be supported to improve image quality and further reductions in compression bandwidth. Due to these multiple demands, a flexible parallel processing approach must be found to meet the demands in a cost effective manner.

A number of algorithmic capabilities are generally common between multiple video decoding/encoding standards, such as MPEG-2, H.264, and SMPTE-VC-1. Deblocking filtering and motion estimation/compensation are two typical examples of general algorithms that are required for video encoding.

For the above mentioned standards motion compensated prediction and block based transform coding is used to encode a video stream and reduce the bit rate needed to transmit or store the same. During the encoding process reconstructed pictures are used to predict the motion for newly arrived pictures. However, the block based encoding introduces artifacts in the reconstructed picture that decrease the overall quality of the encoding. In order to improve the prediction performance and the overall quality of the encoded video a conditional filtering is applied to all reconstructed macroblocks of a picture in the inner loop of the encoding algorithm. The conditional filtering uses a deblocking filter that adjusts its strength depending upon various compression modes chosen to process a macroblock. The following parameters are used in formulating the deblocking filter strength: a quantization parameter; motion vectors; frame or field coding decision result; and luminance pixel values. For example, when the quantization step size parameter is decreased, the amount of filtering is reduced, and when the quantization step size is very small, the filter is shut off. The filter can also be shutoff explicitly or adjusted in overall strength by an encoder at the slice level.

Although the deblocking filter per se is not complex, during the filtering process almost every pixel of a reconstructed picture frame needs to be accessed by the filtering algorithm. This deblocking operation introduces additional stress on the performance and efficiency of the encoding process.

To efficiently support deblocking filtering algorithms and other complex programmable functions, which may vary in requirements across the multiple standards, a processor by itself would require significant parallelism and very high clock rates to meet the requirements. A processor of this capability would be difficult to develop in a cost effective manner for commercial products.

SUMMARY OF THE INVENTION

It will be highly advantageous to efficiently address the high computational requirements of the deblocking filtering problem in a flexible, programmable array processor environment with specially designed, autonomous hardware assists tightly coupled to the processing elements and outside of the processing element execution pipeline. This would allow for real time encoding of HD video sequences in accordance with multiple different digital video standards.

In one or more of its several aspects, the present invention addresses problems such as those described above. In one of its aspects, the present invention describes an apparatus that allows improvements in deblocking filtering capability in a SIMD array processor.

One embodiment of the present invention addresses an apparatus for scalable block pixel filtering. A command and control function associated with a processing element (PE) is used for processing commands and parameters received from the associated PE and generating transpose addresses and pipeline control signals. A PE local memory stores blocks of pixels and coding parameters. A register file and a byte addressable hardware assist memory hold block pixel data, wherein the block pixel data in the byte addressable memory is accessible though use of the transpose addresses. A sub-block pixel parameter memory and processing computation unit to generate sub-block parameters and a vertical and horizontal edge filtering computation pipeline to filter the block of pixels.

Another embodiment of the present invention addresses a method for scalable block pixel filtering. A block filtering instruction is issued to a processing element (PE) to initiate block pixel filtering hardware by causing at least one command and at least one parameter be sent to a command and control function associated with the PE. A block of pixels is fetched from a PE local memory to be stored in a register file of a hardware assist module. A sub-block of pixels is processed to generate sub-block parameters and the block of pixels is filtered in a horizontal/vertical edge filtering computation pipeline using the sub-block parameters.

Another embodiment of the present invention addresses a method for block filtering. A block of pixels is fetched from a processing element memory to a hardware assist register file. A vertical edge of a block of pixels accessed from the register file is filtered. The filtered block of pixels is stored in a byte addressable memory within a hardware assist module. Blocks of pixels are fetched in transposed order from the byte addressable memory into the register file. A horizontal edge of the pixel block accessed from the register file is filtered. Filtered blocks of pixels are stored in the processing element memory.

These and other features, aspects, techniques and advantages of the present invention will be apparent to those skilled in the art from the following detailed description, taken together with the accompanying drawings and claims.

BRIEF DESCRIPTION OF THE DRAWINGS

FIG. 7 Illustrates IndexA and IndexB dependent threshold parameters α and β;

FIG. 8 Illustrates value of filter clipping parameter C0 as a function of IndexA and Bs parameters;

FIG. 9 Illustrates a 16×16 MB extended left and on top, with 4 vertical and 4 horizontal edges to be filtered;

DETAILED DESCRIPTION

The present invention will now be described more fully with reference to the accompanying drawings, in which several embodiments of the invention are shown. This invention may, however, be embodied in various forms and should not be construed as being limited to the embodiments set forth herein. Rather, these embodiments are provided so that this disclosure will be thorough and complete, and will fully convey the scope of the invention to those skilled in the art.

Further details of attaching an application specific hardware assist function within an array processor for use in conjunction with the present invention is found in U.S. Provisional Application Ser. No. 60/795,140 entitled "Methods and Apparatus for Attaching Application Specific Functions Within an Array Processor" filed Apr. 26, 2006 and incorporated by reference herein in its entirety.

Figure 1:
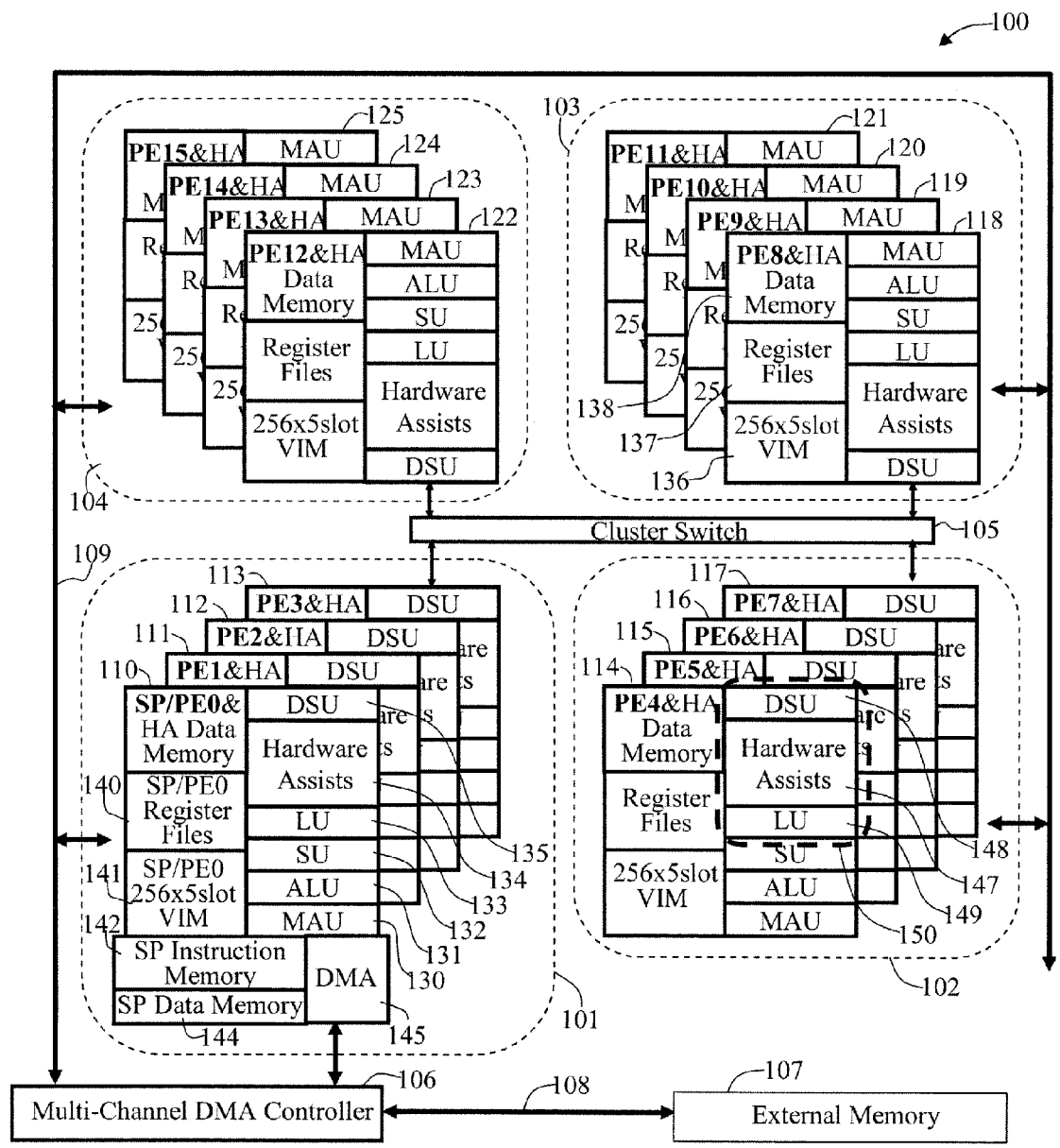
FIG. 1 illustrates a sixteen node video signal processor (VSP$_{16}$) in accordance with one or more embodiments of the present invention.

FIG. 1 illustrates a sixteen-node video signal processor (VSP$_{16}$) 100 in accordance with one or more embodiments of the present invention. The VSP$_{16}$ 100 contains four transform engine (TE) clusters 101-104, an interconnection network cluster switch 105, a multi-channel direct memory access (DMA) controller 106, and an external memory 107. The DMA controller 106 interfaces with the external memory 107 over an external memory bus 108 to transfer data to and from the external memory to each of the TE clusters over a multi-channel DMA bus 109.

Sixteen processor engines (PEs) 110-125 are partitioned in groups of four PEs per cluster as a 4×4 array organization. Each PE provides programmable processing and hardware assist functions. SP/PE0 110 is unique as compared to the other fifteen PEs, 111-125, having an array controlling function combined with the PE function of PE0. The common features of the sixteen PEs 110-125 include a set of instruction execution units including a multiply accumulate unit (MAU) 130, an arithmetic logic unit (ALU) 131, a store unit (SU) 132, a load unit (LU) 133, a hardware assist (HA) 134, a data select unit (DSU) 135, a 256×5 slot very long instruction word memory (VIM) 136, a local PE register file 137, and a data memory 138 local to each PE and HA. Each PE also contains local pipeline controls, decode logic, and control logic appropriate for each PE. All VSP$_{16}$ instructions are executed in a simple pipeline with a majority of instructions requiring a single execution stage and a few instructions requiring two execution stages that are pipelined.

The unique SP/PE0 110 combines a controlling function sequence processor (SP) combined with PE0 functions. To support the SP and PE0, a separate SP register file and a separate PE0 register file, illustrated in one block as SP/PE0 register files 140 are used to maintain the processing context of the SP and PE0. Though not limited to this, the SP/PE0 shares a single VIM 141. To control the VSP$_{16}$ the SP has a single thread of control supported by an SP instruction memory 142 and an SP data memory 144. The SP provides program control, contains instruction and data address generation units, supports interrupts, provides DMA control, and dispatches instructions to the PEs 110-125. The SP executes branches and controls the fetching and issuing of instructions such as load VLIW and execute VLIW instructions. The load VLIW instruction provides an indirect VIM address and is used to load the instruction slots at the specified VIM address. The execute VLIW instruction causes a VLIW to be selected at a specified indirect VIM address and executed.

The single SP thread of control supports 4×4 sub-threads which operate synchronously in lock step single instruction multiple data (SIMD) fashion. Each sub-thread uses very long instruction words (VLIWs) which are indirectly selected and executed by the single SP thread. Each VLIW in each PE at the same VIM address may be different but all unmasked PEs access the same VIM address when executing a VLIW. Five 32-bit instruction slots are provided in each PE, such that with 16 PEs 80 32-bit instructions can execute simultaneously. In addition single, dual, quad, and octal packed data operations may be specified independently by each slot instruction thereby supporting up to 8*80=640 instruction specified operations per cycle. As an example of the processing power this provides, a VSP$_{16}$ operating at 250 Mhz may achieve 640*250 Mhz=160 Giga operations per second.

The VSP$_{16}$ processor also uses an interconnection network cluster switch 105 providing single cycle data transfers between PEs within clusters and between PEs in orthogonal clusters. The communication operations are controlled by a DSU instruction which can be included in a VLIW thereby overlapping communications with computations which with proper software pipelining the communication latency can be reduced to zero. The communication operations operate independently of the DMA which may operate in the background to stream data between the local PE memories and the external memories.

To support additional processing capability for application specific functions such as motion estimation/compensation, deblocking filters as described in further detail below, and other high compute functions, hardware assists (HAs) are provided. A HA unit has one or more multi-cycle tightly-coupled state machine functions which provide memory intensive application specific operational capability to the $VSP_{16}$. To provide a scalable mechanism for adding multiple HAs, a novel tightly coupled interface is provided by the load unit (LU) and data select unit (DSU) of each PE. For example, HA unit 147 interfaces with DSU 148 and LU 149 and the local data memory associated with PE4 114 as a transform engine 150.

Deblocking Filtering

A digital video sequence consists of a series of pictures (combined luminance and chrominance samples) arranged in a temporal succession. The sequence may contain either progressive or interlaced frames, which may be mixed together within the same video stream.

Figure 2:
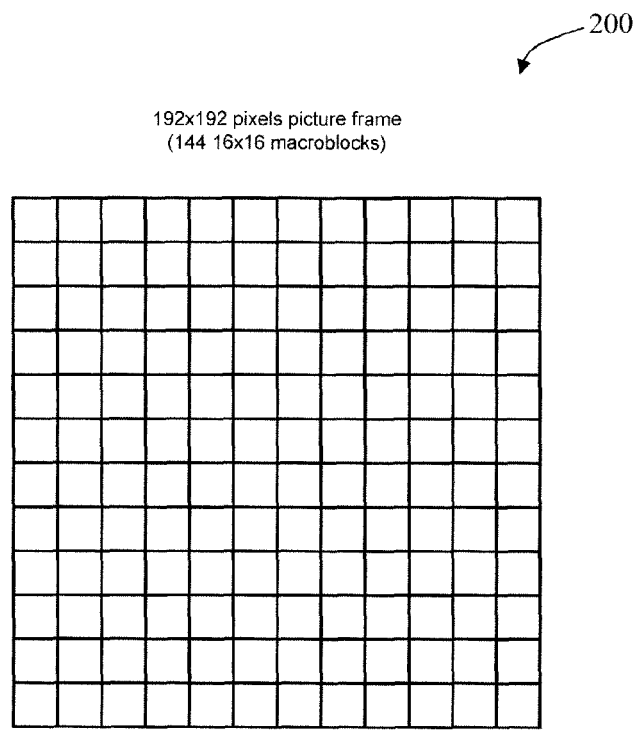
FIG. 2 illustrates subdivision of a picture frame into 16×16 macroblocks.
Figure 3:
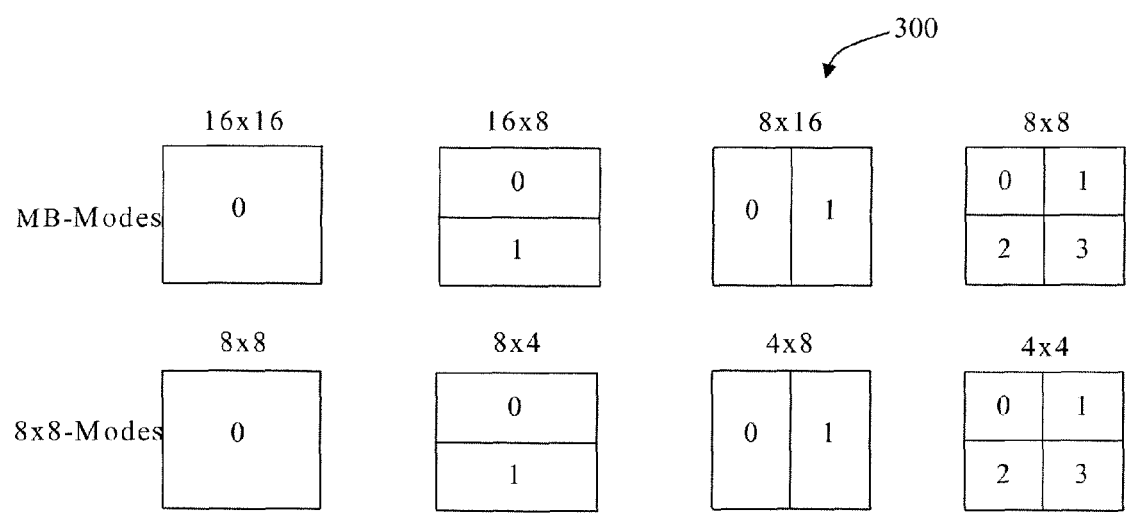
FIG. 3 illustrates partitioning of a macroblock into different blocks.

FIG. 2 illustrates subdivision of a picture frame into 16×16 macroblocks. For video coding, in general, both frame and field pictures are divided into macroblocks of 16×16 luminance samples each, with two associated 8×8 chrominance samples. For instance, a picture frame with 192×192 pixels is divided into 144 macroblocks as indicated in FIG. 2. In addition, each macroblock can be further partitioned into a set of blocks as shown in FIG. 3 which illustrates the partitioning of a macroblock into different blocks.

Both H.264/AVC and SMPTE/VC-1 use an in-loop deblocking filter to reduce the artifacts introduced in a picture by a block-based coding scheme. The filtered pictures are used to predict the motion for other pictures. The deblocking filter is an adaptive filter that adjusts its strength depending upon compression mode of a macroblock (Intra or Inter), the quantization parameter, motion vector, frame or field coding decision and the pixel values. For example, the effect of the filter is automatically emphasized/deemphasized depending on the transform coding quantization step, and it can be completely shutoff if the quantization step is sufficiently small. The filter is also explicitly controlled by the encoder, and can be shutoff or adjusted in overall strength on the slice level of the encoding syntax.

Figure 4:
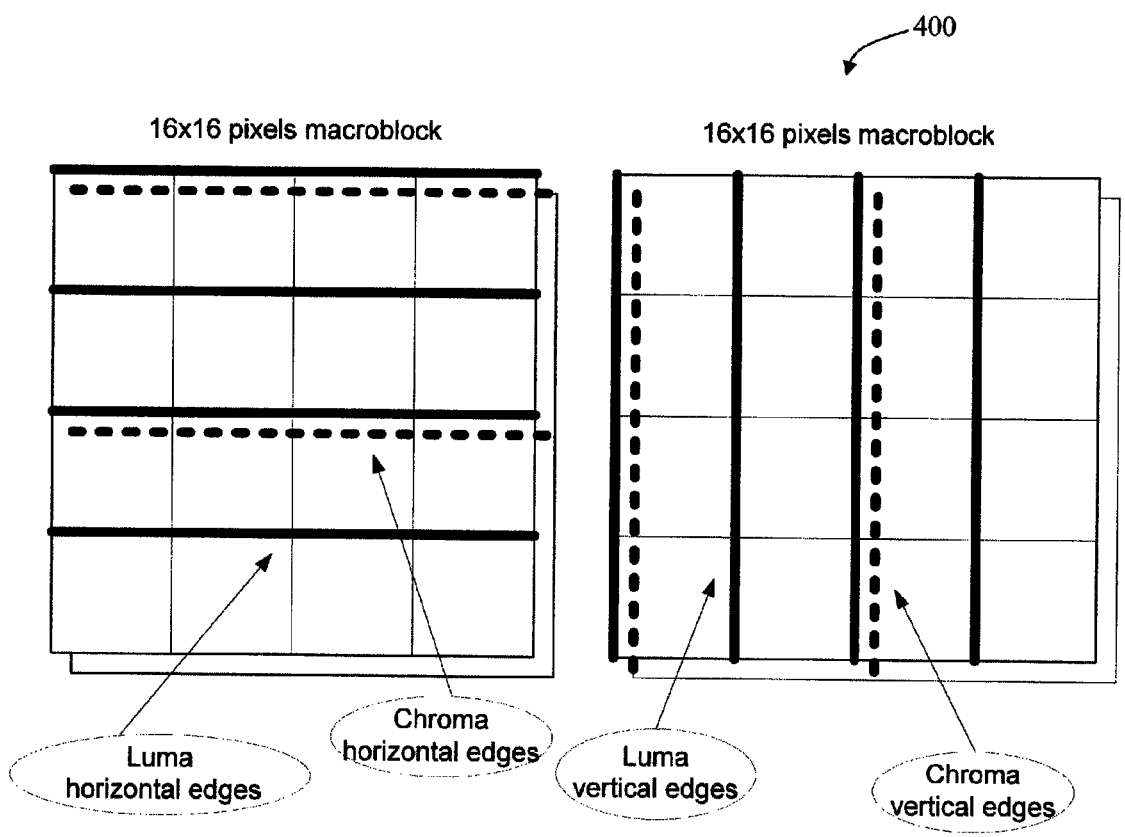
FIG. 4 illustrates boundaries in a macroblock to be filtered (luma boundaries shown with solid lines and chroma boundaries shown with dotted lines)

FIG. 4 illustrates boundaries in a macroblock to be filtered (luma boundaries shown with solid lines and chroma boundaries shown with dotted lines). Conditional filtering is applied to all reconstructed macroblocks of a picture, and it is controlled and executes on the macroblock level. As the first step, the 16 pels of each of the 4 vertical edges internal to the macroblock of the 4×4 raster is filtered as shown on the right side of FIG. 4 (horizontal filtering). Filtering of the 4 horizontal edges internal to the macroblock follows (vertical filtering). The very edge of a picture frame is not filtered.

Content Dependent Boundary Filtering Strength

Figure 5:
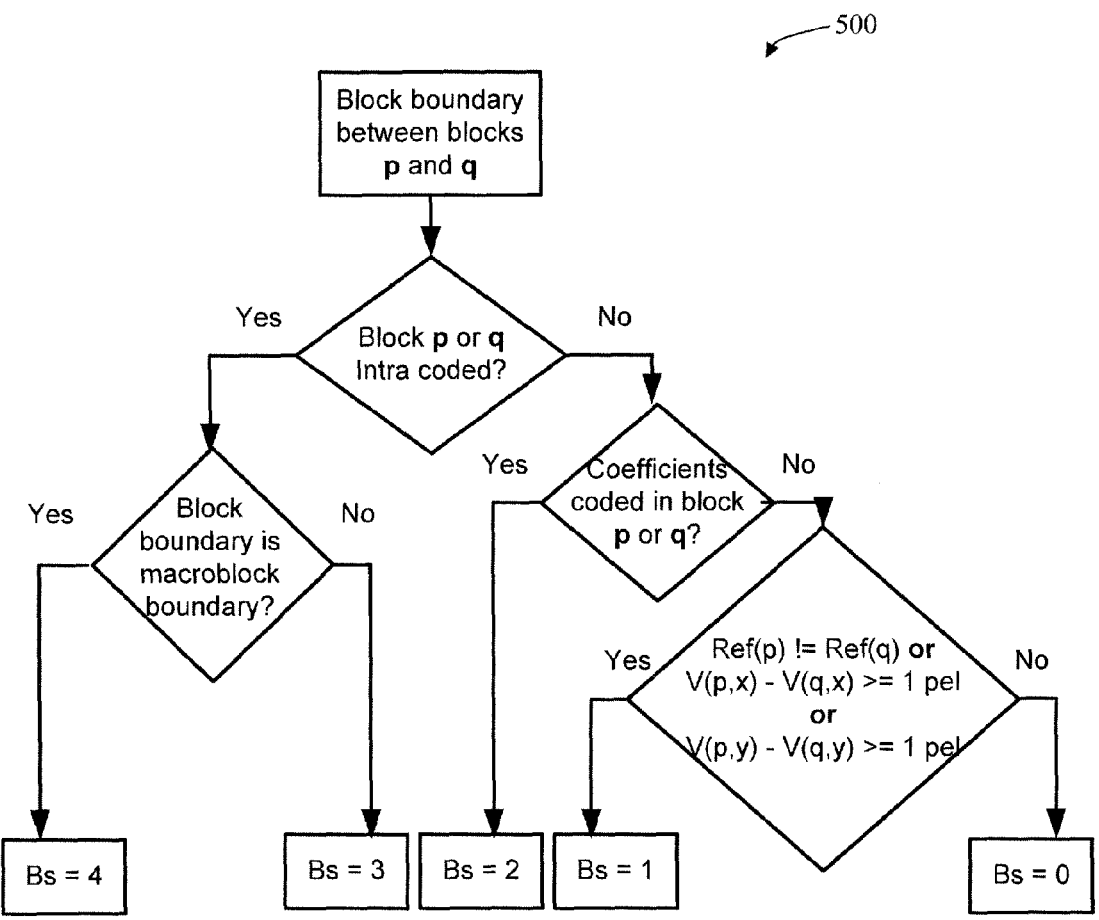
FIG. 5 Illustrates flow chart for determining the boundary strength (Bs), for the block boundary between two neighboring blocks p and q, where Ref(p) is the reference frame or field of block p and V(p) is the motion vector of block p.

FIG. 5 Illustrates flow chart for determining the boundary strength (Bs), for the block boundary between two neighboring blocks p and q, where Ref(p) is the reference frame or field of block p and V(p) is the motion vector of block p. For each boundary between neighboring 4×4 luma blocks, a "boundary strength" (Bs) value is assigned, as shown in FIG. 5, that influences the strength of filtering for this particular section of boundary. As indicated in FIG. 4, every block boundary of a chroma block corresponds to a specific boundary of a luma block. Bs values for chroma are not calculated, but simply copied from the corresponding luma Bs values.

Thresholds for Each Block Boundary

Figure 6:
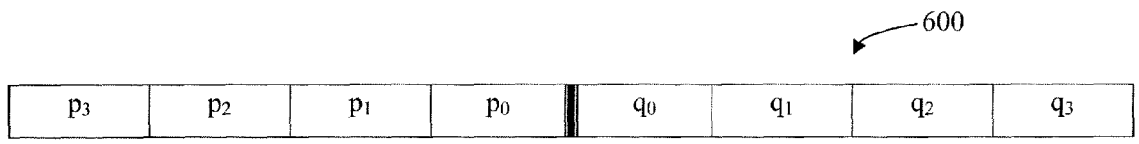
FIG. 6 Illustrates a convention for describing horizontal or vertical pixels across 4×4 block horizontal or vertical boundary.

FIG. 6 Illustrates a convention for describing horizontal or vertical pixels across 4×4 block horizontal or vertical boundary. In the description, the set of eight samples across a 4×4 block horizontal or vertical boundary is denoted as shown in FIG. 6 with the actual boundary of four pixels to be filtered at a time lying between contiguous vertical or horizontal 4×4 pixel blocks denoted by p and q. Filtering across a certain 4×4 block boundary is skipped altogether if the corresponding Bs value is equal to zero. Sets of samples across this edge are only filtered if the condition presented below is true:

$$Bs \neq 0 \text{ \&\& } |p_0-q_0|<\alpha \text{ \&\& } |p_1-p_0|<\beta \text{ \&\& } |q_1-q_0|<\beta.$$

FIG. 7 Illustrates IndexA and IndexB dependent threshold parameters $\alpha$ and $\beta$. They depend on the average value of $QP_{av}$ for the two 4×4 blocks, $QP_{av}=(QP_p+QP_q+1)>>1$, which is built into the values of IndexA and IndexB computed as:

$$IndexA=\text{clip3}(0,51,QP_{av}+\text{FilterOffset}A)$$

$$IndexB=\text{clip3}(0,51,QP_{av}+\text{FilterOffset}B).$$

The parameters FilterOffsetA and FilterOffsetB are encoder selected offset values used to control the properties of the deblocking filter on the slice level of the encoding process syntax.

Filtering of Edges with Bs<4

The equations below are used to filter $p_0$ and $q_0$ pixels. Here, uppercase letters indicate filtered pixels and lower case letters indicate unfiltered pixels with regard to the current edge filtering operation. In general, $p_1$ and $p_2$ may indicate pixels that have been modified by the filtering process of a previous block edge.

$$\Delta=\text{clip3}(-C,C,(((q_0-p_0)<<2+(p_1-q_1)+4)>>3))$$

$$P_0=\text{clip1}(p_0+\Delta)$$

$$Q_0=\text{clip1}(q_0-\Delta)$$

where C is determined by setting C equal to C0 and then incrementing C by one if $a_p<\beta$, and again by one if $a_q<\beta$, where C0 is specified in FIG. 8 and the two intermediate threshold variables $a_p=|p_2-p_0|$, and $a_q=|q_2-q_0|$ are computed and then used to determine whether pixels $p_1$ and $q_1$ are to be filtered. These pixels are only processed for luma. FIG. 8 Illustrates value of filter clipping parameter C0 as a function of IndexA and Bs parameters If $a_p<\beta$ for a luma edge, a filtered sample $P_1$ is produced as specified by $$P_1=p_1+\text{clip3}(-C0,C0,(p_2+(p_0+q_0)>>1-2*p_1)>>1)$$

If $a_q<\beta$ for a luma edge, a filtered sample $Q_1$ is produced as specified by $$Q_1=q_1+\text{clip3}(-C0,C0,(q_2+(p_0+q_0)>>1-2*q_1)>>1)$$

Pixels $p_2$, $p_1$, $q_1$, and $q_2$ are not filtered.

Filtering of Edges with Bs=4

When Bs is equal to 4, if the condition $a_p<\beta$ && $\text{Abs}(p_0-q_0)<((\alpha>>2)+2)$ holds, filtering of the p pixels is defined by the equations:

$$P_0=(p_2+2*p_1+2*p_0+2*q_0+q_1+4)>>3$$

$$P_1=(p_3+2*p_2+2*p_1+2*p_0+q_0+4)>>3,$$

and in the case of luma filtering only:

$$P_2=(2*p_3+3*p_2+p_1+p_0+q_0+4)>>3.$$

If the condition $a_p<\beta$ && $\text{Abs}(p_0-q_0)<((\alpha>>2)+2)$ does not hold, the following filter is applied:

$$P_0=(2*p_1+p_0+q_1+2)>>2,$$

$$P_1=p_1,$$

$$P_2=p_2.$$

For filtering of the q pixels, if the condition $a_q<\beta$ && $\text{Abs}(p_0-q_0)<((\alpha>>2)+2)$ holds, filtering is defined by the equations:

$$Q_0 = (p_1 + 2*p_0 + 2*q_0 + 2*q_1 + q_2 + 4) >> 3$$

$$Q_1 = (p_0 + 2*q_0 + 2*q_1 + 2*q_2 + q_3 + 4) >> 3,$$

and, in the case of luma filtering only:

$$Q_2 = (2*q_3 + 3*q_2 + q_1 + q_0 + p_0 + 4) >> 3$$

If the condition $a_q < \beta$ && $Abs(p_0 - q_0) < ((\alpha >> 2) + 2)$ does not hold, the following filter is applied:

$$Q_0 = (2*q_1 + q_0 + p_1 + 2) >> 2,$$

$$Q_1 = q_1,$$

$$Q_2 = q_2.$$

It is noted that the $Q_1(block_n)$ might be used and be overwritten as $P_2$ during the calculation of $block_{n+1}$. The same is true for $Q_2(block_n)$ which might become $P_1(block_{n+1})$. It is further noted that clip3(a, b, c)=a if c<a, =b if c>b, otherwise=c; and clip1(c)=clip3(0, 255, c).

DSU Deblocking Hardware Assist Module for Deblocking Filtering

As stated above, this module contains logic and independent multi-cycle state machines to perform deblocking filtering on 4×4 block of pixels. Its operation is initiated and the results are collected with a set of hardware assist instructions. The unit operates autonomously on a given MB, and in parallel with other hardware assist units. Standard DSU instructions do not interfere with this unit and can be issued in parallel with the operations of this unit. The results are collected in the miscellaneous register group, and/or in the local HA/PE memory.

FIG. 9 illustrates a 16×16 MB extended on the left and on the top with four pixels to allow for the MB's left and top edge filtering. Four vertical and four horizontal edges to be filtered are shown.

Figure 10:
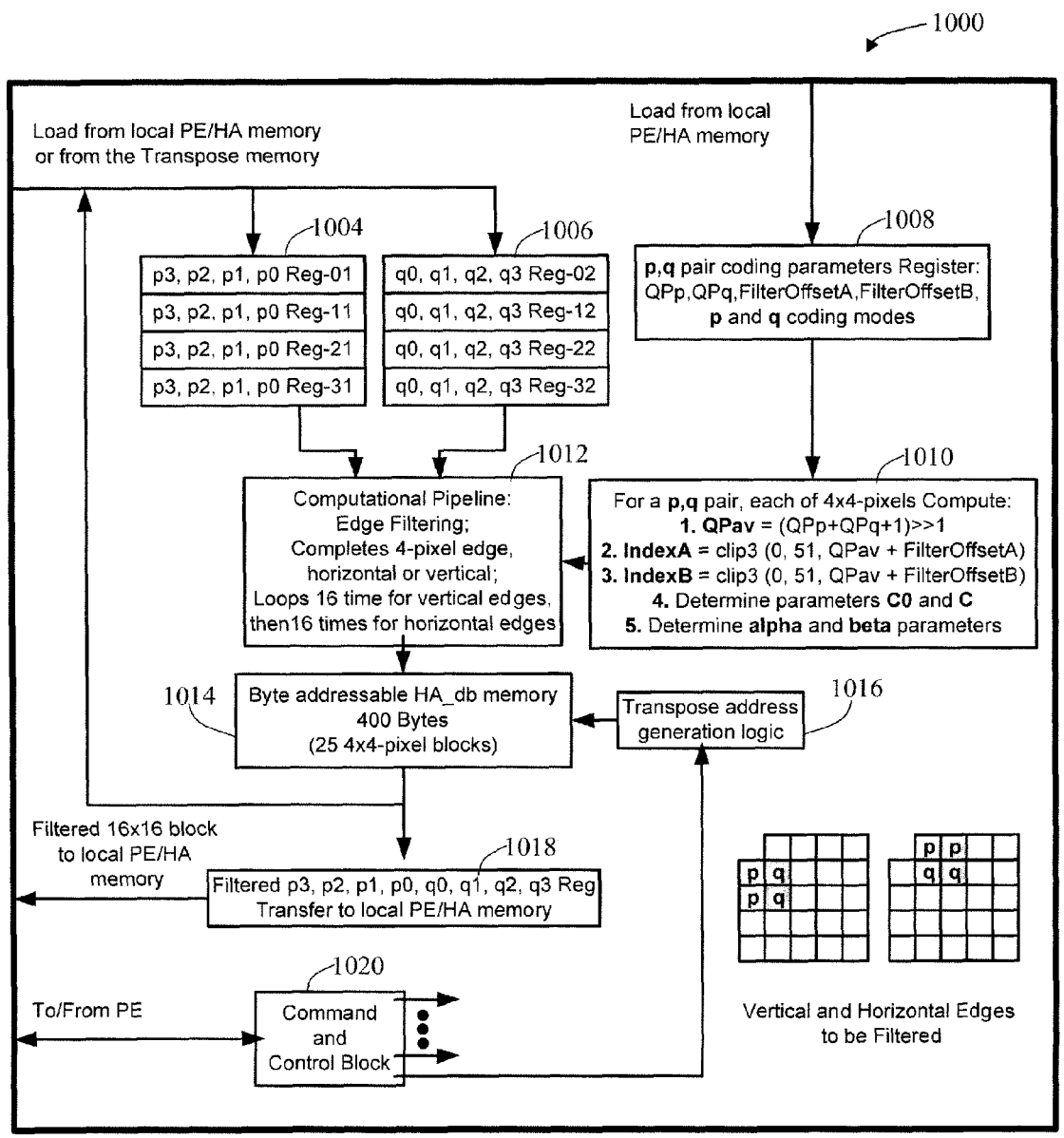
FIG. 10 Illustrates a top level data flow showing the process of deblocking filtering on vertical and horizontal edges of a MB extended four pixels up and to the left.

FIG. 10 Illustrates a top level data flow 1000 showing the process of deblocking filtering on vertical and horizontal edges of a MB extended four pixels up and to the left. As indicated in FIG. 10, for a current block of 24 4×4 pixels, the hardware assist pipeline operates on p,q pairs and the vertical or horizontal edges between them.

The vertical filtering is performed first by loading p,q pairs, each of 4×4 pixels, following the horizontal raster scan of the 25×25 pixel extended macroblock. One pair of p,q blocks is processed at a time. The pixels are loaded into the hardware assist register file, Reg-01/11/21/31 1004 and Reg-02/12/22/32 1006.

The coding parameters (QPp,QPq,FilterOffsetA,FilterOffsetB, and p and q coding modes) associated with the current p,q pair are also loaded into the hardware assist local registers 1008, and are used in the decision making logic 1010.

For each p,q pair, a set of derived parameters are determined in the decision making logic 1010 as listed below:
1. QPav=(QPp+QPq+1)>>1
2. IndexA=clip3 (0, 51, QPav+FilterOffsetA)
3. IndexB=clip3 (0, 51, QPav+FilterOffsetB).
The above values are used to read lookup tables in order to determine the parameters $\alpha$, $\beta$, Bs, and C0 and C.

Based on a set of raw and derived parameters the computational pipeline 1012 performs horizontal or vertical edge filtering on 8 pixels p3, p2, p1, p0, q0, q1, q2, q3.

This process continues in a loop, 16 time for vertical edges, each with 4 row/columns with 8 pixels, and then 16 times for horizontal edges, each with 4 row/columns of 8 pixels.

Each set p3, p2, p1, p0, q0, q1, q2, q3 of horizontal pixels is filtered first, and then stored in the hardware assist byte addressable memory 1014 for further processing. Next, the hardware assist byte addressable memory is read in transposed order by use of transpose address generation logic 1016 and a set of p3, p2, p1, p0, q0, q1, q2, q3 vertical pixels are stored in the local register file. When all 16 horizontal edges between p,q pairs are processed and filtered pixels are stored back in the byte addressable memory 1014, the horizontal/vertical filtering process is complete. Subsequently the entire block of filtered pixels is transferred to the PE/HA local memory through the output register 1018 of the hardware assist unit.

The command and control block 1020 contains the state machines controlling and scheduling the entire filtering process and data transfer from/to the local PE/HA memory.

Figure 11:
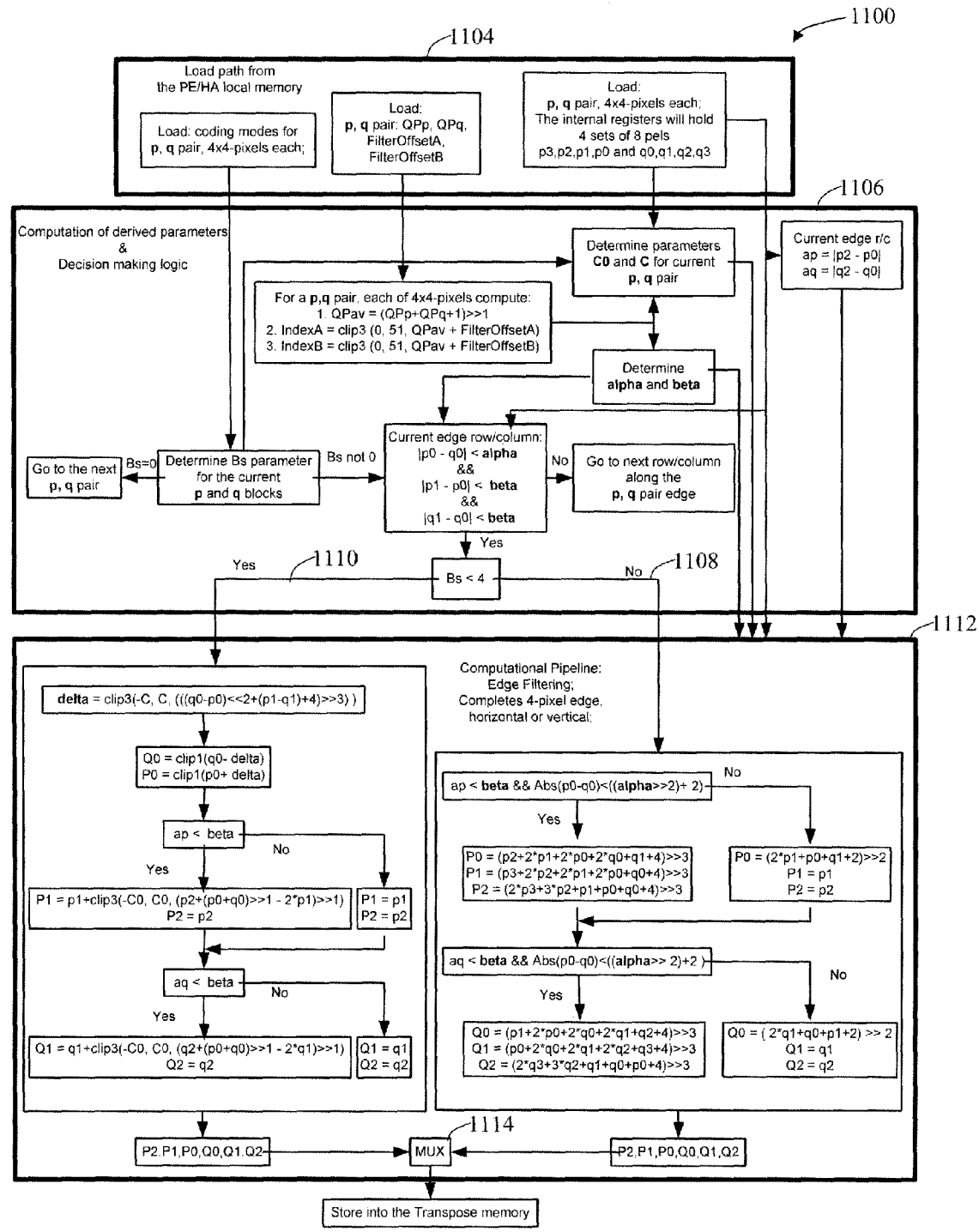
FIG. 11 Illustrates a detailed block diagram showing the block of pixels and associated parameters loading, decision making logic, and filtering data paths for processing of each pixel of a vertical/horizontal edge row/column block of 8 pixels.

FIG. 11 Illustrates a detailed block diagram 1100 showing the block of pixels and associated parameters loading, decision making logic, and filtering data paths for processing of each pixel of a vertical/horizontal edge row/column block of 8 pixels. Each filtering data path processes a block of 8 row/column pixels of a vertical/horizontal edge.

The load path 1104 from the PE/HA local memory block loads the p,q pair of pixels and associated coding and filtering parameters as: coding modes; QPp, QPq; FilterOffsetA, and FilterOffsetB. The p, q pair, consisting of 2 4×4 blocks of pixels, is loaded into two sets of four registers. Each set of registers accommodates 4 row/column pixels p3, p2, p1, p0 or q0, q1, q2, q3. In a steady state processing only one set of 4 registers needs to be loaded from the local PE/HA memory with new pixels since the processing of a MB proceeds in raster scan order (first horizontally and then vertically) with the previous q block renamed to p and a the new q block loaded from the PE/HA local memory.

The Computation of derived parameters and Decision making logic 1106, as shown in FIG. 11, derives a set of new parameters necessary for the decision making logic which selects one of the main compute data paths, generally Bs=4 data path 1108 or Bs<4 data path 1110.

The computational pipeline 1112 operates on either data path branch. Either data path branch of the computational pipeline performs actual arithmetic operations associated with the edge filtering, as shown in the computational pipeline 1112 diagram of FIG. 11. The filtering process branches into multiple execution paths based on the values of parameters $a_p$, $q_p$, $\alpha$, and $\beta$. The computational pipeline 1112 completes one row/column of edge filtering and passes the result through a multiplexer 1114 back into the byte addressable transpose memory, such as the byte addressable memory 1014 of FIG. 10.

While the present invention has been disclosed in the context of various specific illustrative embodiments, it will be recognized that the invention may be suitably applied to other environments and applications consistent with the claims which follow.

We claim:

1. A hardware assist unit (HAU) for block pixel filtering, the HAU comprising:
   a data storage unit configured to store pixel data fetched from a macroblock stored in an memory device coupled to the HAU and transposed filtered pixel data generated in the HAU;
   a command and control function that receives commands and parameters from a control device coupled to the HAU to initiate block filtering operations in the HAU and is configured to generate transpose addresses and pipeline control signals associated with block filtering operations;
   a computation pipeline circuit configured to determine boundary strength (Bs) values for block boundaries between two neighboring pixel blocks selected from the stored pixel data and to perform edge filtering according to a Bs value associated with the edge being filtered and on the transposed filtered pixel data in response to the pipeline control signals to generate filtered pixel data; and a hardwire assist memory coupled to the data storage unit and configured to store the filtered pixel data, wherein the filtered pixel data is accessed in transposed order using the transpose addresses.

2. The HAU of claim 1, further comprising:
an output storage unit coupled to the hardware assist memory and configured to store in the memory device a block of filtered pixel data accessed from the hardware assist memory.

3. The HAU of claim 1, wherein a first state machine sequence operates on the pixel data from the macroblock loaded from the memory device to filter the vertical edges and a second state machine sequence operates on the filtered pixel data in transposed order loaded from the hardware assist memory to filter the horizontal edges.

4. The HAU of claim 1, wherein the computation pipeline circuit comprises:
a parameter computation pipeline circuit configured to generate derived parameters; and
a data computation pipeline circuit configured according to the Bs value associated with the edge being filtered to select a computation data path to perform the edge filtering according to the derived parameters.

5. The HAU of claim 1, wherein the control device comprises:
a means for sending at least one command to the command and control function to initiate the block pixel filtering in the HAU.

6. The apparatus of claim 1, wherein the control device comprises:
a very long instruction word (VLIW) memory (VIM) storing in a VLIW a first instruction for execution on a function execution unit in the control device to transfer a command to the HAU to initiate the block pixel filtering on the HAU.

7. A method for scalable block pixel filtering, the method comprising:
receiving a first block filtering command in a first hardware assist unit (HAU) from a first control device to initiate a first block pixel filtering operation;
fetching a first block of pixels from a first macroblock stored in a first memory device to a first data storage unit in the first HAU in response to the first block filtering command, wherein the first memory device and the first control device are external to the first HAU;
processing two neighboring pixel blocks selected from the first block of pixels accessed from the first data storage unit to generate sub-block parameters including a boundary strength (Bs) value for a block boundary between the two neighboring pixel blocks; and
filtering the first block of pixels fetched from the first data storage unit in a horizontal and vertical edge filtering computation data path selected according the Bs value.

8. The method of claim 7 further comprising:
receiving a second block filtering command in a second HAU from a second control device to initiate a second block pixel filtering operation;
fetching a second block of pixels from a second macroblock stored in a second memory device to a second data storage unit in the second HAU in response to the second block filtering command, wherein the second memory device and the second control device are external to the second HAU;
processing two neighboring pixel blocks selected from the second block of pixels accessed from the second data storage unit to generate sub-block parameters including a boundary strength (Bs) value for a block boundary between the two neighboring pixel blocks; and
filtering the second block of pixels fetched from the second data storage unit in a horizontal and vertical edge filtering computation data path selected according to the Bs value.

9. The method of claim 8, wherein the filtering of the first block of pixels occurs in parallel with the filtering of the second block of pixels.

10. The method of claim 7, wherein the filtering of the first block of pixels comprises:
filtering horizontal edges of the first block of pixels according to a boundary strength value for a horizontal boundary to generate a horizontal filtered first block of pixels to be stored in a byte addressable memory within the first HAU;
fetching the horizontal filtered first block of pixels from the byte addressable memory; and
filtering vertical edges of the fetched horizontal filtered first block of pixels according to a boundary strength value for a vertical boundary to generate a filtered first block of pixels to be stored in the byte addressable memory.

11. The method of claim 10 further comprising:
transferring the filtered first block of pixels from the byte addressable memory in the first HAU to the first memory device in parallel with operations in the first control device.

12. The method of claim 8, wherein the filtering in the second HAU comprises:
filtering horizontal edges of the second block of pixels according to a boundary strength value for a horizontal boundary to generate a horizontal filtered second block of pixels to be stored in a byte addressable memory within the second HAU;
fetching the horizontal filtered second block of pixels from the byte addressable memory; and
filtering vertical edges of the fetched horizontal filtered second block of pixels according to a boundary strength value for a vertical boundary to generate a filtered second block of pixels to be stored in the byte addressable memory.

13. The method of claim 12 further comprising:
transferring the filtered second block of pixels from the byte addressable memory in the second HAU to the second memory device in parallel with operations in the second control device.

14. The method of claim 10, wherein the fetching the horizontal filtered first block of pixels comprises:
generating transpose addresses to fetch vertical edges from the horizontal filtered first block of pixels stored in the first data storage unit.

15. A method of block pixel filtering, the method comprising:
fetching a first block of pixels from a first memory device to a first hardware assist unit (HAU) in parallel with fetching a second block of pixels from a second memory device to a second HAU;
determining boundary strength (Bs) values for block boundaries between two neighboring pixel blocks within each fetched block of pixels in each HAU;

filtering horizontal edges of the first block of pixels according to a determined first Bs value in the first HAU to produce a first filtered block of pixels in parallel with filtering horizontal edges of the second block of pixels according to a determined second Bs value in the second HAU to produce a second filtered block of pixels; and storing the first filtered block of pixels in a first transpose memory within the first HAU in parallel with storing the second filtered block of pixels in a second transpose memory within the second HAU.

16. The method of claim 15 further comprising:

fetching the first filtered blocks of pixels in transposed order from the first transpose memory as a first transposed block of pixels in parallel with fetching the second filtered block of pixels in transposed order from the second transpose memory as a second transposed block of pixels;

determining boundary strength (Bs) values for block boundaries between two neighboring pixel blocks within each fetched transposed block of pixels in each HAU;

filtering vertical edges of the first transposed block of pixels according to a determined third Bs value to produce a third filtered block of pixels in parallel with filtering vertical edges of the second transposed block of pixels according to a determined fourth Bs value to produce a fourth filtered block of pixels; and storing the third filtered blocks of pixels in the first memory device in parallel with storing the fourth filtered block of pixels in the second memory device.

17. The method of claim 16, wherein the first filtered block of pixels is stored in the first transpose memory in a first order and the fetching in transposed order comprises:

generating transpose addresses in a transpose address circuit to address the first transpose memory to access in transpose order the first filtered block of pixels.

18. The method of claim 15, wherein the first HAU operates on the first block of pixels selected from a first macroblock autonomously in parallel with the second HAU that operates on the second block of pixels selected from a second macroblock.

19. The method of claim 15 further comprising:

initiating block filtering operations on the first HAU by a first processing element (PE) in parallel with initiating block filtering operations on the second HAU by a second PE.

20. The method of claim 16 further comprising:

looping the filtering of horizontal edges and vertical edges until pixel blocks comprising the first macroblock and pixel blocks comprising the second macroblock have been filtered.

* * * * *